United States Patent [19]
Goyal et al.

[11] Patent Number: 5,736,168
[45] Date of Patent: Apr. 7, 1998

[54] BLOW MOLD WITH REPLACEABLE INSERTS

[75] Inventors: Shailesh Goyal, Tempe; Thomas Kieran, Phoenix, both of Ariz.

[73] Assignee: Star Container Co., Phoenix, Ariz.

[21] Appl. No.: 715,005

[22] Filed: Sep. 17, 1996

[51] Int. Cl.$^6$ ..................................................... B29C 49/52
[52] U.S. Cl. ........................... 425/183; 249/102; 249/103; 425/522
[58] Field of Search ..................................... 249/102, 103, 249/104; 425/183, 522

[56] References Cited

U.S. PATENT DOCUMENTS

| | | | |
|---|---|---|---|
| 132,897 | 11/1872 | Christie | 249/103 |
| 170,464 | 11/1875 | Bakewell, Jr. | 249/103 |
| 1,559,394 | 10/1925 | Williams | 249/103 |
| 1,595,773 | 8/1926 | Gillinder | 249/103 |
| 2,601,700 | 7/1952 | Pinsky | 425/105 |
| 3,354,509 | 11/1967 | Ammondson | 249/103 |
| 3,380,121 | 4/1968 | Chittenden et al. | 249/104 |
| 3,474,498 | 10/1969 | Hoppes | 249/103 |
| 3,550,197 | 12/1970 | Szajna | 425/525 |
| 3,734,448 | 5/1973 | Rusk et al. | 249/103 |
| 3,871,611 | 3/1975 | Taketa | 249/102 |
| 4,551,084 | 11/1985 | Lake | 249/102 |
| 4,884,961 | 12/1989 | Iizuka et al. | 249/104 |
| 5,560,939 | 10/1996 | Nakagawa et al. | 425/183 |

Primary Examiner—Robert Davis
Attorney, Agent, or Firm—LaValle D. Ptak

[57] ABSTRACT

A mold for forming hollow blow molded containers is made in multiple sections to create a cavity in the shape of the desired container when the mold is in the closed position. A recess is formed in the inner surface of at least one of the sections of the mold body, and a removable insert is designed to be placed in the recess. The insert may carry design indicia on it; and it is held in place by a set screw extending through the top of the mold body section in which it is located. Thus, insertion and removal of different inserts may be accomplished without disassembling the mold.

17 Claims, 3 Drawing Sheets

BLOW MOLD WITH REPLACEABLE INSERTS

BACKGROUND

The manufacture of blow molded containers made of bi-axially oriented thermoplastic material is becoming increasingly popular. Lightweight, thin walled containers made of thermoplastic materials, consisting of polyester resin and thermoplastic polymers, are well known in the container industry. Many applications for containers made of polyethylene terephthalate (PET) currently exist. These containers are being used for packaging beverages, foodstuffs, cosmetics, medicines, etc. PET containers are readily molded by orientation blowing to produce transparent thin walled containers having high impact strength and excellent stiffness. This is done with a high molding accuracy. PET containers also are substantially heat resistant and are produced by the bi-axial-orientation blow-molding process, in which a parison is oriented both laterally and longitudinally in a temperature range which is suitable for the orientation. Bi-axially oriented blow-molded containers have greater stiffness and strength, as well as improved gas barrier properties and transparency.

Because of the ability to mold PET containers with high molding accuracy, PET containers are replacing prior art glass containers in many applications. A primary advantage of PET containers is the lightweight thin walled characteristic, which substantially reduces the bulk of the combination of container and product and the weight of the container/product for shipping and handling purposes. Another obvious advantage over glass containers is the high impact resistance of PET containers; so that losses during handling and shipping are significantly reduced.

As PET containers gain greater acceptance, many companies utilizing such containers find it desirable to mold a design or trademark into the container wall to produce a customized container for products uniquely associated with the company using the container. The standard practice has been to incorporate inserts into the mold as a permanent part of the mold. Where large quantity runs are to be made from the mold, such dedication to the production of a container including such a customized insert is no problem. If, however, production runs do not permit utilization of the maximum production capabilities of the mold machine in which the mold is mounted, inefficiencies resulting in increased unit costs of containers result. If a changeover of the entire mold to one having different customized inserts (or no inserts at all) is required, the down time for the mold changeover generally is significant.

Efforts to produce molds with removable inserts in them, for facilitating the production of different customized designs in containers, have been attempted in the past. One such effort is disclosed in the U.S. Pat. No. 2,601,700 to Pinsky. This patent discloses the use of a recess located in the side of a mold for receiving a removable insert carrying unique indicia on its face. The insert is placed within a recess or cavity in the surface of the mold; and it does not constitute an entire mold surface in and of itself. Two different techniques for removably attaching these inserts are shown in the Pinsky patent; and both of these require access to both sides of the mold (namely the inside cavity and the exterior of the mold itself opposite the cavity. As a consequence, a changeover from one insert to another requires some disassembly of the mold from the machine in which it is carried in order to provide this access.

Another U.S. Pat. No No. 3,380,121 to Chittenden discloses a cylindrical mold in which replaceable inserts are used on both of the mold halves. The manner in which these inserts are held in place and changed is shown most clearly in FIGS. 1 and 2. The hemi-cylindrical inserts are configured to fit against the mold interior; and they are clamped in place by vertical clamping strips on each of the mold halves. These strips are screwed into the mold halves to secure them to the mold half and in turn clamp the inserts in place. Full access to the interior of the mold is required in order to secure the inserts; so that the mold must be fully opened to expose completely each of the two halves so that the inserts can be changed. Essentially, this means that the mold requires disassembly in order to replace the inserts. It also should be noted that the Chittenden patent does not employ inserts for only a portion of the interior wall cavity, but replaces the entire interior surface of the mold cavity with different inserts.

A different approach is disclosed in the U.S. Pat. No. 3,550,197 to Szajana. This patent uses an insert which is glued onto the interior of a smooth mold surface. Solvents must be used to remove the insert. Obviously, the glue which is used must be able to withstand the molding temperatures. This is a relatively crude and inaccurate approach to providing a patterned insert on the interior of the mold.

The U.S. Pat. No. 4,884,961 to Iizuka is directed to a relatively complex changeable insert for forming collapsed panels in a container. Although this patent states that the inserts are changeable, it is readily apparent from the complexity of the system that no quick change capability is present.

It is desirable to provide a blow mold assembly which overcomes the disadvantages of the prior art, and which permits a simple lock system to enable fast and easy change of inserts in the mold.

SUMMARY OF THE INVENTION

It is an object of this invention to provide an improved mold for use in the production of blow molded thermoplastic containers.

It is another object of this invention to provide an improved blow mold assembly having changeable inserts.

It is an additional object of this invention to provide an improved blow mold assembly having changeable inserts which are quickly and easily changeable.

It is a further object of this invention to provide an improved blow mold assembly with changeable inserts, which may be placed into and removed from the mold assembly quickly and easily without requiring disassembly of the mold.

In accordance with a preferred embodiment of the invention, a mold for use in producing blow molded thermoplastic containers comprises a multi-section mold body. This mold body forms a cavity in the closed position in the shape of the container to be produced by the mold. A recess is formed in the inner surface of at least one of the sections of the mold cavity. Removable inserts dimensioned to fit into the recess are designed to be placed in it; and the inserts are releasably secured in the recess in the section of the mold body without requiring disassembly of the mold.

DETAILED DESCRIPTION

Figure 1:
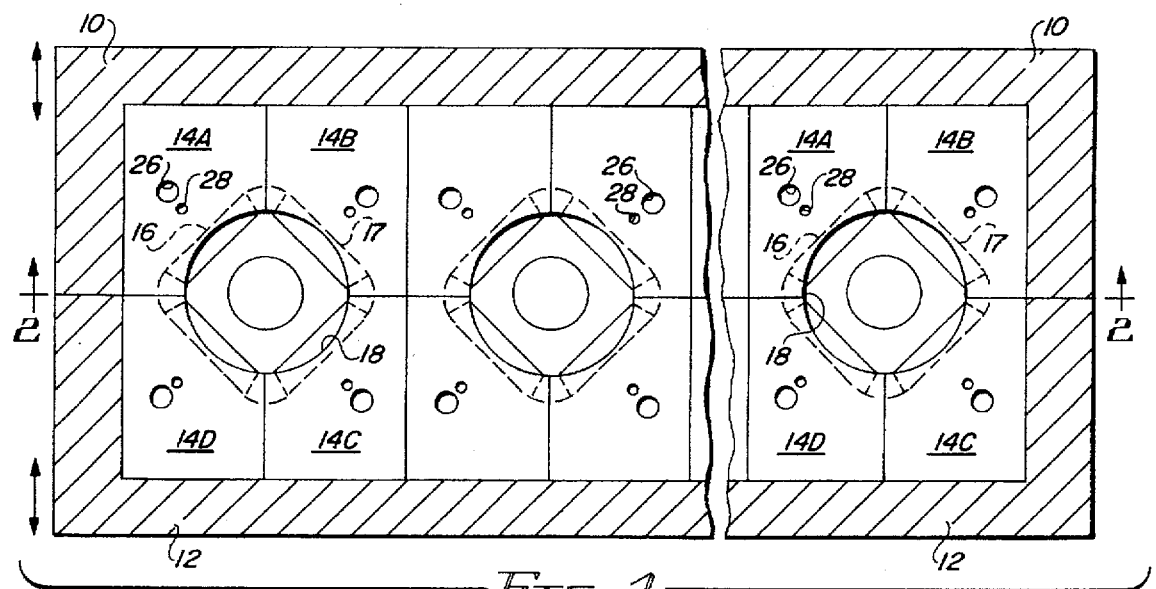
FIG. 1 is a top view of a preferred embodiment of the invention.

Reference now should be made to the drawings, in which the same reference numbers are used throughout the different figures to designate the same components. FIG. 1 is a top view of a multiple cavity mold made in accordance with a preferred embodiment of the invention. The mold consists of two symmetrical halves 10 and 12, which form a parting line for the mold horizontally across the center of the assembly, as illustrated in FIG. 1. The sections 10 and 12 are mounted in a mold machine for movement toward and away from one another. It should be noted that the mold which is shown in the various figures of the drawing is used in conjunction with a standard blow-mold molding apparatus; and conventional techniques which are used for forming blow molded PET containers are employed in conjunction with the specific mold structures shown in the various figures of the drawing. The standard molding machine features are not illustrated in the drawings, since these features do not constitute any part of the invention, and since blow molding apparatus is well known.

Figure 2:
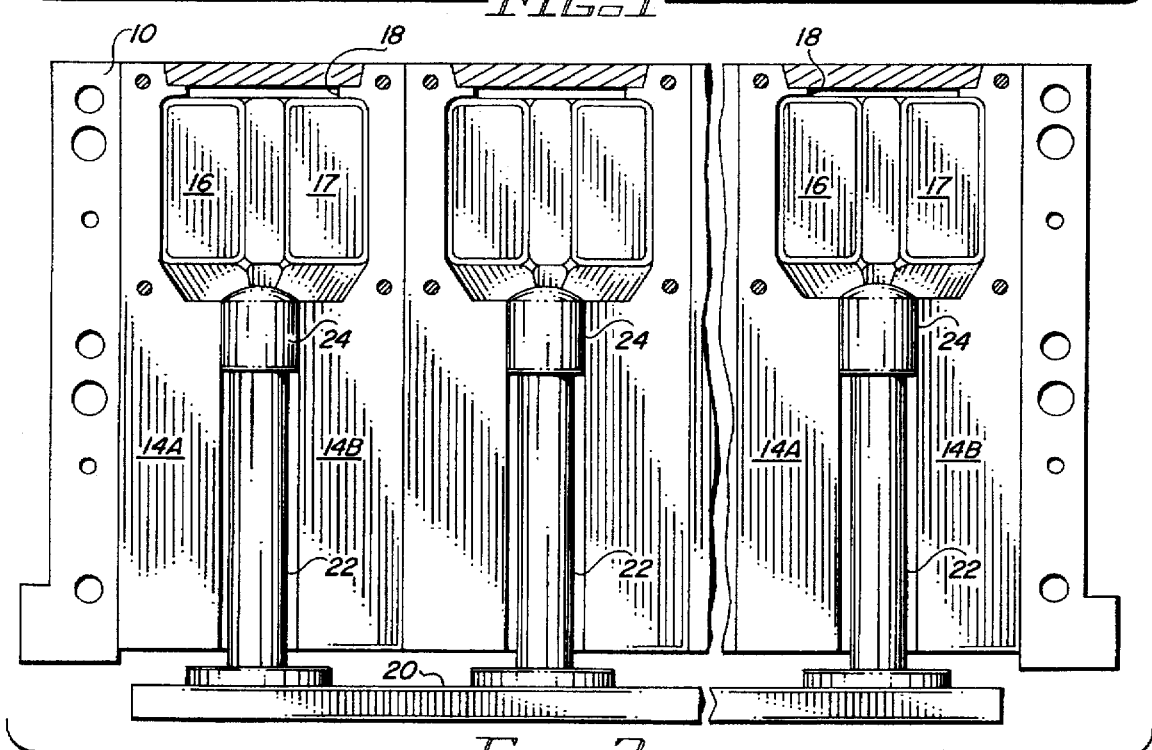
FIG. 2 is a cross-sectional view taken along the line 2—2 of FIG. 1.
Figure 3:
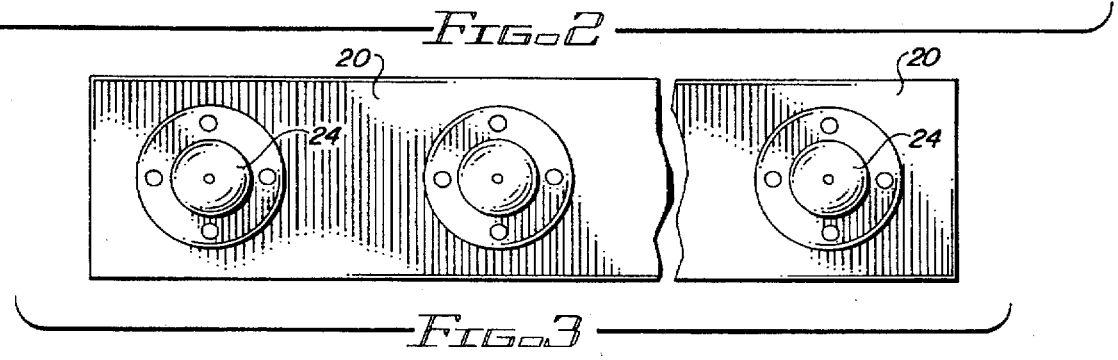
FIG. 3 is a top view of a portion of the bottom assembly shown in FIG. 2.
Figure 4:
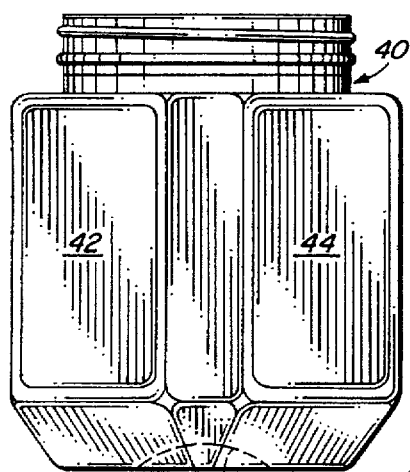
FIG. 4 is a side view of a container made in the mold assembly shown in FIGS. 1 to 3.
Figure 5:
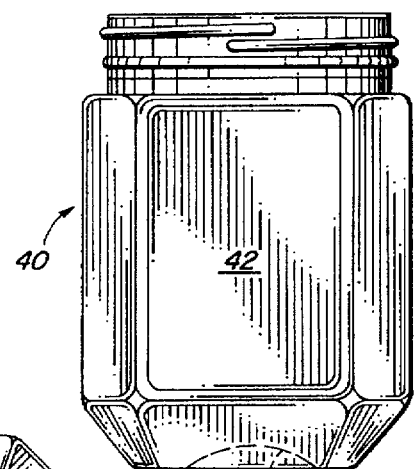
FIG. 5 is a different side view of the container shown in FIG. 4.
Figure 6:
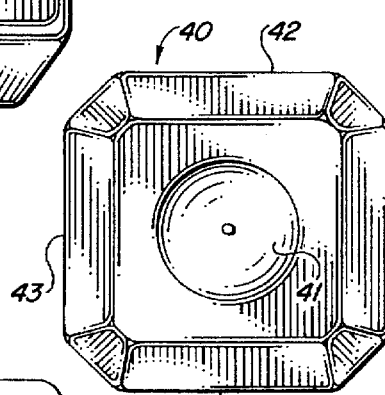
FIG. 6 is a bottom view of the container shown in FIGS. 4 and 5.

The details of the overall mold structure are illustrated in FIGS. 1 through 3. Each of the separate mold cavities is formed by four different mold sections 14A, 14B, 14C and 14D comprising the four quarters of the mold, as illustrated most clearly in FIG. 1. In the particular illustration which is used throughout the different figures of the drawing, the mold cavity is designed to form a PET container with four large rectangular flat surfaces, interconnected diagonally by four relatively smaller rectangular flat surfaces. The container which is formed by the mold shown in FIGS. 1 and 2 is illustrated in FIGS. 4 through 6. This container comprises a jar 40 with major flat surfaces 42, 43, 44 and 45, some of which are shown in FIGS. 4 and 5. In addition, the container 40 has a hemispherical concave depression 41 formed in the bottom, also as shown most clearly in FIGS. 4, 5 and 6.

As shown in the top view of FIG. 1, the container which is to be made in the various cavities of the mold has an upper open circular top 18 formed by the four quadrants of the sections 14A, 14B, 14C and 14D. In addition, the sections 14A and 14B include surfaces 16 and 17, which are used to form the surfaces 42 and 44, for example, of the container shown in FIGS. 4 through 6. In the top of each of the four sections or mold blocks, a pair of holes 26 and 28 are drilled or formed vertically downwardly through the blocks 14A, 14B, 14C and 14D to depths which are shown most clearly in FIG. 11. These vertical holes are located on a line extending radially outwardly from the center of the mold cavity, as is most readily apparent from an examination of FIG. 1.

The bottom of the mold cavity is closed by the bottom mold assembly comprising a bottom plate 20, to which are attached hollow vertical plastic supply tubes 22 with a center air inlet. The top end of the tubes 22 are closed with an upper cap 24, which has a hemispherical top in it for producing the concave depression 41 in the bottom of the finished container, as shown in FIGS. 4 through 6. This type of structure, as illustrated most clearly in FIGS. 2 and 3, is conventional, and is used in conventional blow mold assemblies.

The internal configuration of the sections 14A, 14B, 14C and 14D may be varied to form containers of any desired shape; and the container specifically illustrated in conjunction with all of the figures of this drawing is used only for illustration and is in no way limiting of the container shapes which may be produced by molds incorporating the invention.

Figure 7:
FIGS. 7 and 8 are front views of inserts used in the mold assembly of FIGS. 1 and 2.
Figure 8:
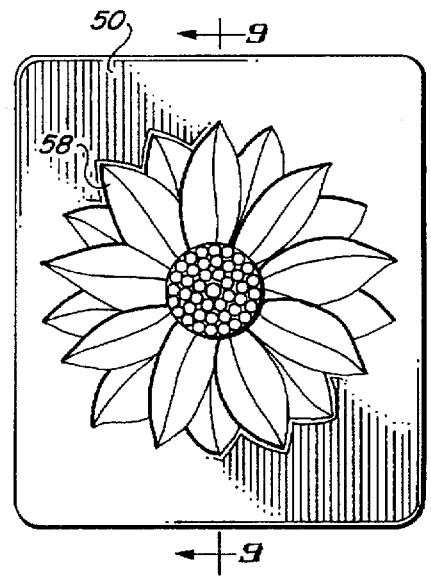

Reference should be made to FIGS. 7 through 11, which illustrate the specific features of replaceable inserts used in conjunction with the mold shown in FIGS. 1 through 3. FIGS. 7 and 8 are different front or face views of an insert 50, which is used in conjunction with the mold of FIGS. 1 through 3 to form different, "embossed" designs on the surface of a container blow molded in the mold. FIG. 7 shows a word pattern or word design 56 which may be used. This pattern is a mirror image of the positive pattern which actually will appear on the outside of the container. The pattern in FIG. 8 is of a design which alternatively may be used instead of a word message, such as the pattern 56 of FIG. 7. It should be noted that the patterns 56 and 58 merely are representative of an infinite variety of patterns which may be employed for customizing the appearance of a container made in the mold of FIGS. 1 through 3.

Figure 9:
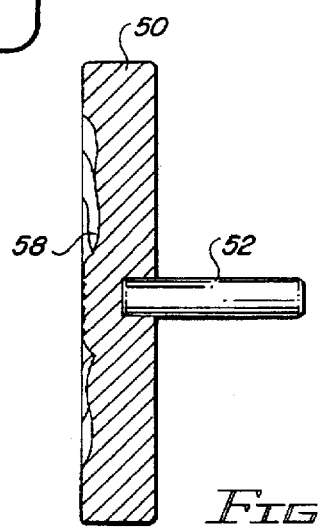
FIG. 9 is a cross-sectional view taken along the line 9—9 of FIG. 8.

FIG. 9 is a cross section of the insert shown in FIG. 8, and comprises the insert member 50, which has a thickness designed to fit into and conform with a recess 51 (shown most clearly in FIG. 11) located in the face of the appropriate section 14A, 14B, 14C or 14D of the mold body. Approximately at the center point of the rear surface of the insert 50, a dowel pin or rod 52 extends at right angles. The pin or rod 52 is secured to the insert block 50 in any suitable manner, and as shown in FIG. 9, may be set into a tap hole or receptacle. Once the dowel pin 52 is secured in place and the appropriate design is formed on the face of the insert 50, the insert is ready for use in the mold. Typically, the inserts 50 are made of aluminum for use in PET injection molds; although other suitable materials may be employed, which are compatible with the materials of the mold sections 14A, 14B, 14C and 14D and with the temperature ranges encountered in the molding operation.

Figure 10:
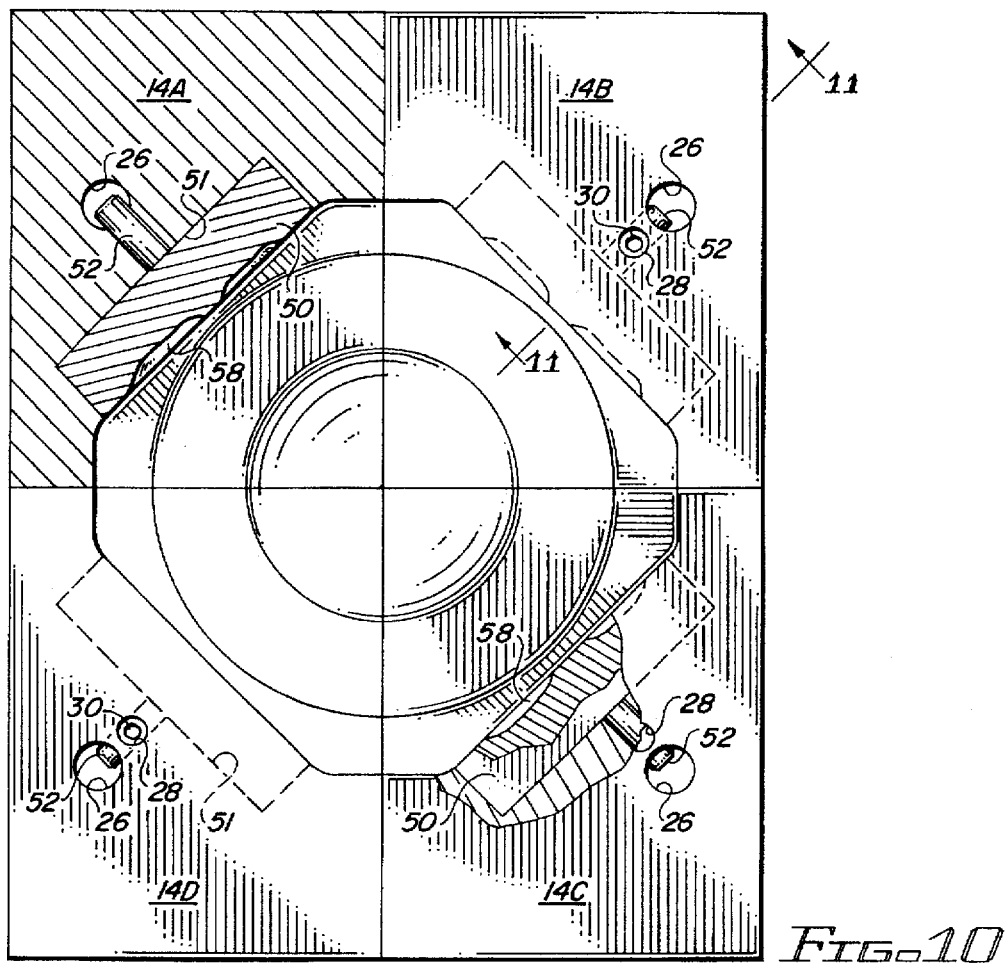
FIG. 10 is an enlarged partially cut-away top view of a portion of the embodiment shown in FIG. 1, illustrating details of the invention.
Figure 11:
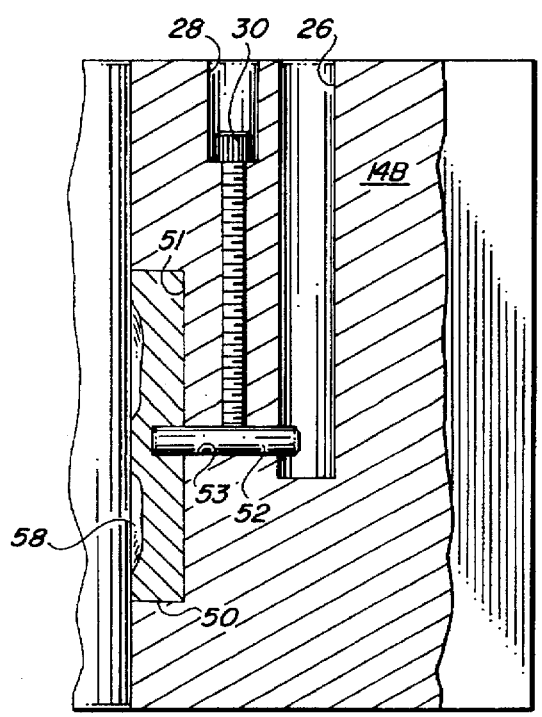
FIG. 11 is a cross-sectional view taken along the line 11—11 of FIG. 10.

As shown in FIGS. 10 and 11, when an insert 50 is placed in the recess 51 located in the section of the mold body, the pin 52 extends through a corresponding tap hole 53 extending at right angles to the face of the recess 51 in the mold section, such as 14B for example. As shown in FIGS. 10 and 11, the pin 52 extends past the bottom of the hole 28 and into the hole 26 extending a short distance into the hole 26 and located a short distance above the bottom of the hole 26. This is shown most clearly in FIG. 11.

Once the pin 52 is securely in place in the position shown in FIGS. 10 and 11, a set screw 30 is rotated in the tapped hole 28 to engage the pin 52 and hold it firmly in place in the hole or channel 53. At such time as the insert 50 is to be removed and replaced with another insert, the set screw 30 is loosened or removed to relieve the pressure on the pin 52. An elongated rod or screwdriver, which has a smaller outside diameter than the inside diameter of the hole 26, then is inserted downwardly into the hole 26 and is moved to press against the end of the dowel pin 52 to push the insert 50 outwardly into the interior of the cavity formed in the mold section 14B, of which the section lab shown in FIG. 11 is a part. Once the insert 50 is extended beyond the interior wall of the mold, it may be grasped and withdrawn to pull the pin 52 entirely out of the channel 53. The insert 50 then may be removed from the open top of the mold 18 and replaced with another insert 50 through the open top of the mold 18. In the present example, this is readily accomplished because the width of the insert 50 is selected to be less than the diameter of the top 18 of the mold; and the combined length of the pin 52 and the thickness of the insert 50 also is less than the diameter of the opening in the top of the mold. This permits insertion and replacement of the inserts 50 without requiring any disassembly of the mold 10/12 whatsoever.

Because removal and replacement of inserts 50 is such a simple operation, a mold using the insert system shown and described in the drawings quickly may be changed over to provide different patterns on the faces 42, 43, 44 and 45 of the containers for production runs which are insufficient to justify a dedicated mold. This is particularly important for a container manufacturer which produces containers for various different customers. Custom containers may be fabricated at a fraction of the cost which would be required for dedicated molds or molds which require a significant down time to change inserts in them. Inserts rapidly may be changed on any one or on all four of the sections of the mold shown in FIGS. 1 and 2. Clearly, different numbers of sections may be used; although the four section mold structure which is shown in FIG. 1 is a desirable configuration.

The foregoing description of the preferred embodiment of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A mold for use in producing blow molded thermoplastic containers including in combination:

a multi-section mold body having a top, a bottom and inner side surfaces forming a cavity in the closed position thereof;

a recess formed in the inner side surface of at least one of said sections of said mold body;

a removable insert having a face surface and a rear surface with a pin extending perpendicularly from the rear surface thereof for placement in said recess and said mold body having a hole for receiving said pin extending into said one of said sections of said mold body; and a device for releasably securing said insert in said one of said sections of said mold body engaging said pin in said hole without disassembling said mold.

2. The combination according to claim 1 wherein said device for releasably securing said insert engages said insert through the top of said mold section in which said recess is formed.

3. The combination according to claim 2 further including first and second openings spaced from said cavity in said one of said sections of said mold body with said first opening extending from the top of said one of said sections into said hole at a point between said recess and the end of said hole; with said second opening extending past the end of said hole and located so that said pin extends partially into said second opening, with said insert located in said recess.

4. The combination according to claim 3 wherein said device for releasably securing said insert comprises a set screw in said first opening.

5. The combination according to claim 4 wherein said removable insert is a metal insert.

6. The combination according to claim 5 wherein said metal insert is an aluminum insert.

7. The combination according to claim 6 wherein said inner surface of said at least one of said sections of said mold body is a substantially flat inner surface and said removable insert is substantially flat with a design formed therein.

8. The combination according to claim 7 wherein said cavity formed in said multi-section mold body has an opening through the top therein having a predetermined diameter, and wherein said removable insert has a width less than said predetermined diameter to facilitate insertion and removal of said insert through the top of said multi-section mold body.

9. The combination according to claim 2 wherein said removable insert is a metal insert.

10. The combination according to claim 9 wherein said metal insert is an aluminum insert.

11. The combination according to claim 9 wherein said inner surface of said at least one of said sections of said mold body is a substantially flat inner surface and said removable insert is substantially flat with a design formed therein.

12. The combination according to claim 1 further including first and second openings spaced from said cavity in said one of said sections of said mold body with said first opening extending from the top of said one of said sections into said hole at a point between said recess and the end of said hole; with said second opening extending past the end of said hole and located so that said pin extends partially into said second opening, with said insert located in said recess.

13. The combination according to claim 12 wherein said device for releasably securing said insert comprises a set screw in said first opening.

14. The combination according to claim 1 wherein said cavity formed in said multi-section mold body has an opening through the top therein having a predetermined diameter, and wherein said removable insert has a width less than said predetermined diameter to facilitate insertion and removal of said insert through the top of said multi-section mold body.

15. The combination according to claim 1 wherein said removable insert is a metal insert.

16. The combination according to claim 15 wherein said metal insert is an aluminum insert.

17. The combination according to claim 1 wherein said inner surface of said at least one of said sections of said mold body is a substantially flat inner surface and said removable insert is substantially flat with a design formed therein.

* * * * *